Patented Mar. 6, 1928.

1,661,588

UNITED STATES PATENT OFFICE.

KARL von NEERGAARD, OF BASEL, SWITZERLAND, ASSIGNOR TO CHEMICAL WORKS FORMERLY SANDOZ, OF BASEL, SWITZERLAND.

THERAPEUTIC BOUGIE.

No Drawing. Application filed June 21, 1924, Serial No. 721,589, and in Switzerland June 30, 1923.

The therapeutic and prophylactic treatment of mucous membrane canals and fistulæ has long been effected by the introduction of medicaments in form of bougies or rods, which liquefy at body temperature, and in this way bring the medicament into contact with the mucous membranes. By this method, however, the pathogenic bacteria which are situated deep down in the folds of the mucous membranes and fistulæ are not reached. The present invention has for its object the preparation of a bougie which by means of its property of first swelling and finally liquefying brings the healing substance into uninterrupted contact with the pathogenic bacteria even in the case of mucous membranes or fistulæ having folds, in that through the swelling of the bougies the folds are extended so that the mass is at the same time pressed deep into the folds of the mucous membranes. At the same time, however, the result of the present process is, that with the use of silver salt as therapeutic agents, these latter are transformed from their ionogenic to a highly dispersed, colloidal form. The process consists in that a water soluble silver salt, for example silver nitrate, is mixed with substances capable of swelling up until liquefaction, which at the same time act as protective colloids whereby the silver is combined with the swelling substances and is consequently transformed into a highly dispersed form, whereupon from the mixture bougies are formed in the usual way.

The following are of use for the present purpose as protective colloids capable of swelling: starch, tragacanth, agar-agar, gum arabic, dextrin, gelatine, flea-wort, laminaria, carrageen, quince mucilage, marshmallow, linseed.

The silver salt enters highly dispersed combinations with the colloids contained in the bougie mass, the irritating effect of the silver is eliminated and through the presence of protective colloids at the same time the formation of highly dispersed silver chloride by the sodium chloride of the body fluids is favoured.

That the silver in the greater part is no longer in the form of the added salt, but is combined with the protective colloids, has been shown to be true by potentiometric titration and electrometric silver concentration cell measurement. The existence of a colloidal silver compound could be proved by a great reduction of the dissociation as against an equimolecular silver nitrate solution.

It has been found that materials can be advantageously added to the bougie mass which favour the swelling action, as for example, sulfates, citrates, oxalates, cane sugar, urea, weak alkaline substances, further materials coming into consideration as suitable additions are those which favour the diffusion, for example, kieselguhr, and substances which increase the elasticity under which glycerine may be specially mentioned.

The same protective action, due to the above mentioned swelling colloids, may be obtained with certain organic dyestuffs which may advantageously be added in small quantities as protective colloids. For example, erythrosine-silver is highly dispersed and for this reason very active. Owing to the conversion of the ionogenic silver into the highly dispersed colloidal form, the quantity of a dissociated silver salt for therapeutic purposes—otherwise limited on account of its irritating properties—can be considerably exceeded.

It has further been found that to the bougie mass germicidal and healing materials can be added with advantage.

In order to prevent the bougie from sliding out of the mucous membrane canals or fistulæ, it is advantageously provided with cross ribs.

To prepare the bougie the colloids and other substances are finely powdered, mixed, evenly damped with an aqueous silver salt solution and the whole thoroughly mixed. It is advisable, in dissolving the silver salt to add only so much liquid—whether water or a mixture of water with another fluid, as for example, glycerine—as is necessary for the even distribution of the silver salt through the powder. This mass is then pressed through a matrix with the object of forming cylindrical, or approximately cylindrical, bougies which in order to prevent the sliding out of the mucous membrane passage, can be provided with cross ribs.

*Example I.*

In order to manufacture the bougies, 10 parts of gum arabic, 20 parts of dextrin, 15 parts of gelatine, 10 parts of tragacanth, 5 parts of starch, 5 parts of agar, 5 parts of terra silic. and one part of urea are well mixed and then kneaded into a homogeneous mass with 5 parts of an aqueous 60% silver nitrate solution and 30 parts of glycerine, whereby the formation of the colloidal silver compound is effected. This operation is advantageously performed in darkness. The mass thus prepared possesses properties set forth in the description, namely of first swelling when coming in contact with the tissue fluids, and then liquefying, and from it suitably formed bougies can be made.

*Example II.*

40 parts of tragacanth, 20 parts of canesugar and 4 parts of kieselguhr are thoroughly mixed together; this mixture is then kneaded, preferably in darkness, into a homogenous mass with a mixture of 14,5 parts of water, 19,5 parts of glycerine and 1,85 parts of silver nitrate or the equivalent quantity of another water soluble silver salt. The thus obtained mass is then pressed through a matrix with the object of forming cylindrical or approximately cylindrical bougies, which, in order to prevent the sliding out of the mucous membrane passage, can be provided with cross ribs.

What I claim is:

1. A process for the manufacture of bougies for the treatment of mucous membrane canals and fistulæ consisting in mixing tragacanth, kieselguhr and urea thoroughly together to form a plastic mass, constituting a mixture of a water soluble silver salt, water and glycerine, kneading said plastic mass with said mixture into a homogeneous mass capable of swelling up until liquefaction within the organ to be treated, and finally forming bougies from this mass.

2. A process for the manufacture of bougies for the treatment of mucous membrane canals and fistulæ, consisting in mixing tragacanth, kieselguhr and urea thoroughly together to form a plastic mass, constituting a mixture of a water soluble silver salt, water and glycerine, kneading said plastic mass with said mixture under addition of erythrosine silver, into a homogenous mass capable of swelling up until liquefaction within the organ to be treated and finally forming bougies from this mass.

3. As a new product of manufacture the hereinbefore described bougies for the treatment of mucous membrane canals and fistulæ, composed on the one hand of tragacanth, kieselguhr, urea and on the other hand of a water soluble silver salt, water and glycerine, all mixed together in convenient relative proportions, so as to constitute a silver compound in highly dispersed state and in such a condition as to first swell up when coming in contact with the tissue fluids and to liquefy thereafter.

In witness whereof I have hereunto signed my name this 7th day of June, 1924.

KARL von NEERGAARD.